Oct. 14, 1958
E. S. WATSON
2,856,530
COHERENT OSCILLATOR
Filed Nov. 15, 1947
2 Sheets-Sheet 1
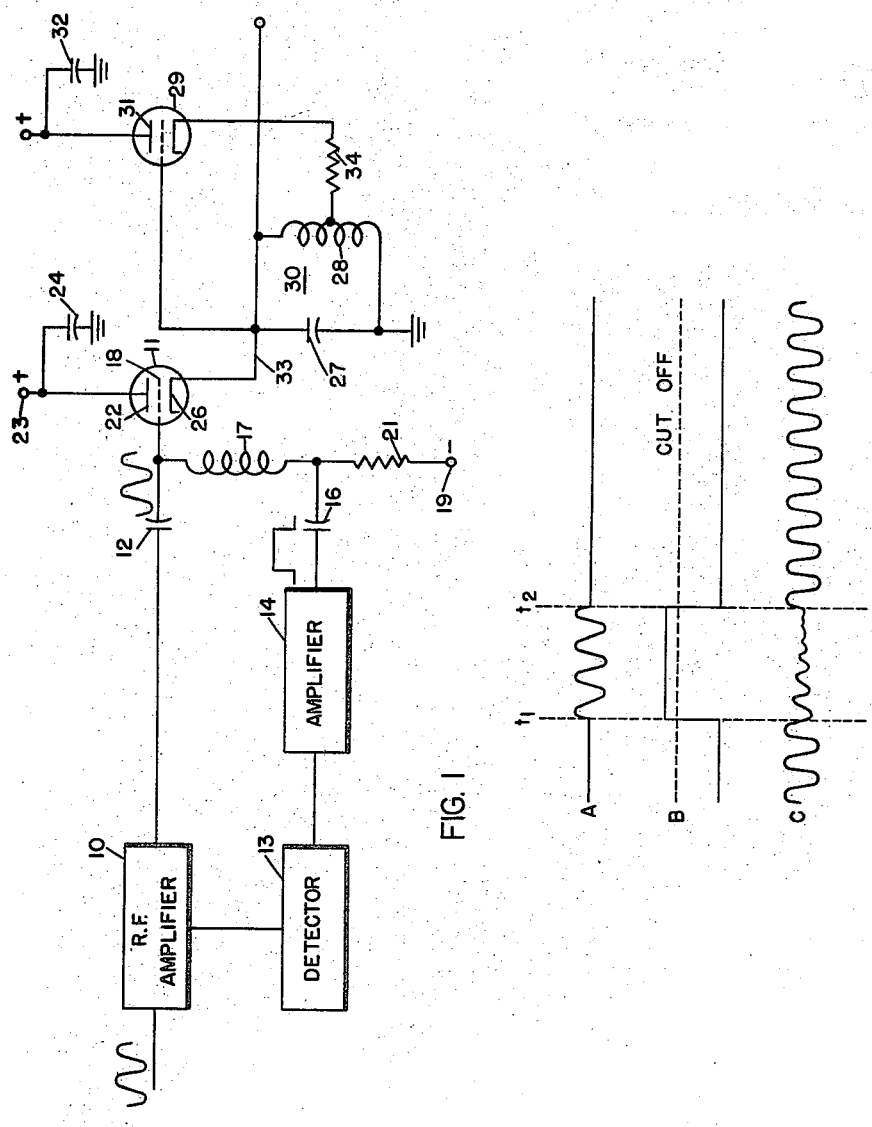
Inventor
EMMETT S. WATSON
By H. A. Mackey
Attorney Inventor
EMMETT S. WATSON United States Patent Office 2,856,530
Patented Oct. 14, 1958

2,856,530

COHERENT OSCILLATOR

Emmett S. Watson, White Plains, N. Y., assignor to General Precision Laboratory Incorporated, a corporation of New York Application November 15, 1947, Serial No. 786,174

8 Claims. (Cl. 250—36)

This invention relates to a coherent oscillator which may periodically be rephased so that its generated signal has the same phase as the oscillations within any particular pulse of a train of high frequency pulse signals.

Various systems have been proposed for utilizing the phenomena known as Doppler shift for determining the relative speed of two objects. In general this phenomenon is utilized by transmitting a signal wave from one object, reflecting it from the other and comparing the frequency of the reflected signal with that of the transmitted signal to determine the difference in frequency or Doppler shift and hence the relative speed of two objects.

When, however, the signal transmitted is in the form of a series of high frequency pulses, no signal is available for comparison purposes at the time any particular reflected pulse is returned. To provide such a comparison signal it is necessary to locally generate signals either of the frequency of the oscillations of the transmitted pulses or some intermediate frequency thereof and to utilize these signals as a means of comparison. It is essential, however, in order that useful information may be derived that the relative phase relation between the locally generated oscillations and the transmitted pulses be kept constant, in other words, the local oscillator must be a coherent oscillator. Generators of high frequency pulse signals, such as for example, magnetrons are random in phase and the oscillations of any particular pulse may start at any point in their cycle. In order then that the local oscillator be coherent, it must generate a signal which while continuing from the time a particular radio frequency pulse is transmitted until its reflection is received, must also be rephased as each new radio frequency pulse is transmitted. It is the purpose of the present invention to provide such an oscillator.

In the instant invention a tube is connected to the tank circuit of a grounded plate Hartley oscillator circuit in such a fashion that when the tube becomes conductive the tank circuit is effectively damped. Normally such tube is maintained in a non-conductive condition and the oscillator oscillates freely. At each instant a radio frequency pulse is generated, however, a square wave pulse is applied to the tube which renders it conductive for a time approximately corresponding to duration of the radio frequency pulse and the tank circuit is so damped during this period as to cause the free oscillations in the tank circuit to approach zero amplitude. At the same time the radio frequency pulse signal is impressed on the tank circuit through the medium of the same damping tube so that immediately the circuit is undamped oscillations are sustained in the tank circuit by the negative resistance of the oscillator tube in the same phase as the oscillations of the particular radio frequency pulse then impressed thereon.

Thus the oscillator generates a continuous signal from the time of transmission of one radio frequency pulse to the next, which signal is in phase with the oscillations of the last transmitted radio frequency pulse and is caused to cease oscillation at the instant of the next succeeding radio frequency pulse transmission and to resume its oscillatory condition and to be rephased in accordance with the oscillations of the next succeeding radio frequency pulse signal.

In the present invention these results have been found possible of attainment even under the most adverse conditions, that is, where the number of cycles in which synchronization may be effected is quite small and where the oscillator may be as much as 180° out of phase with the radio frequency pulse oscillations at the start of the synchronizing period, and therefore constitutes a marked improvement over circuits heretofore used which are incapable of satisfactory operation under these conditions.

The exact nature of the invention will be more clearly understood from the following detailed description when considered in connection with the accompanying drawings, in which:

Figure 1 is a schematic diagram of the invention in simplified form to illustrate its manner of operation.

Figure 2 is a chart illustrating the principal waveforms of the various signals and voltages utilized in the circuit of Fig. 1, and, Figure 3 is a schematic diagram of a more complete circuit, embodying the features of the invention as used in practice.

Figure 3:
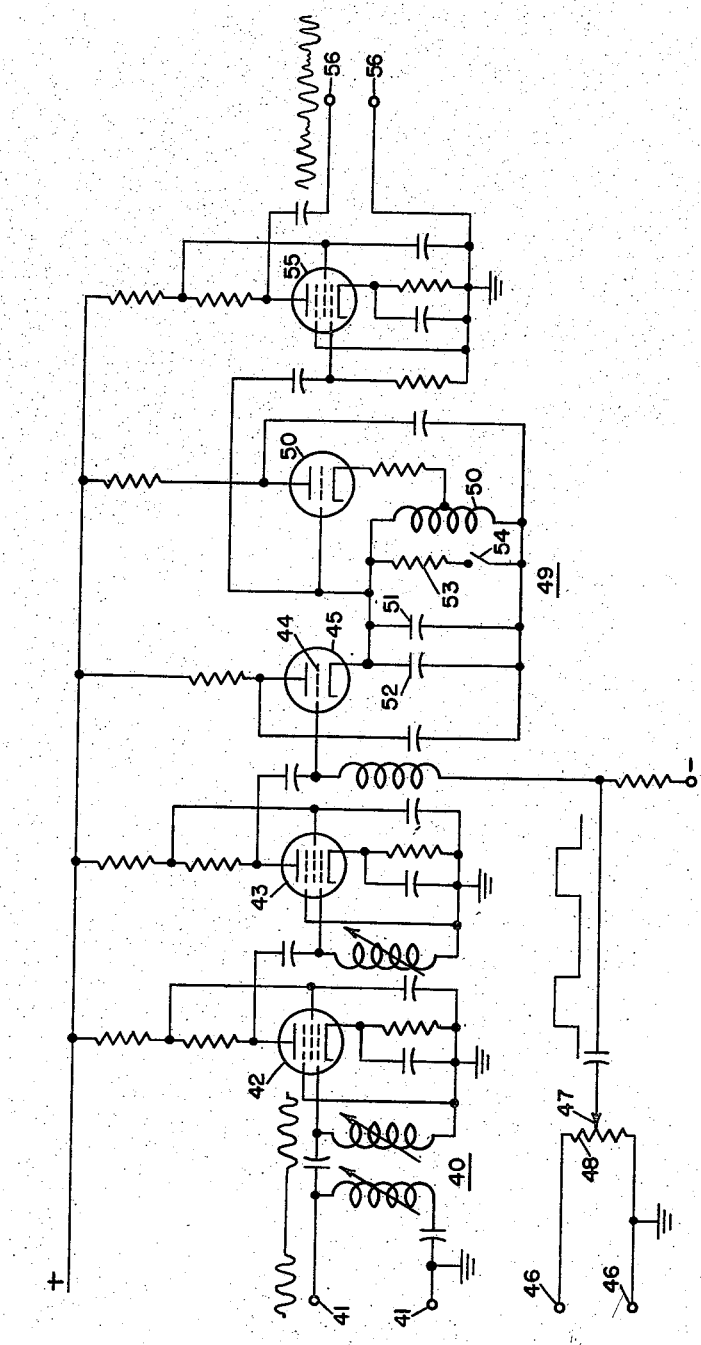

Referring now to the circuit of Fig. 1, the radio frequency pulse signal with which phase synchronization is desired is impressed on the input of a radio frequency amplifier 10. Part of the output of this amplifier is transmitted to the input of tube 11 through a coupling condenser 12 and another portion of the amplified signal is fed to a detector 13 where it is detected and fed to an amplifier 14 producing an amplified signal pulse of constant amplitude and of a duration approximately that of the radio frequency pulse impressed on the input of amplifier 10.

The time relationships and the waveform of these pulses are indicated by the small wave patterns appearing in connection with the circuit of Fig. 1 and the diagrams A and B of Fig. 2.

Referring to this latter diagram the waveform A illustrates the transmitted radio frequency pulse or an intermediate frequency pulse derived therefrom by beating the transmitted radio frequency pulse with a locally generated frequency and this pulse exists from a time $t_1$ to a time $t_2$ which may be as little as a ¼ microsecond. When detected and amplified by detector 13 and amplifier 14 a voltage is produced as indicated by the waveform B, wherein approximately at time $t_1$ a voltage is produced having a constant amplitude until approximately time $t_2$ when the voltage abruptly decreases.

This square wave pulse is likewise impressed on the input of tube 11 through coupling condenser 16 and radio frequency choke 17 so that there is simultaneously impressed on the grid 18 a voltage corresponding to waveform A and a voltage corresponding to waveform B. Additionally a static bias potential is impressed on grid 18 from the negative terminal 19 through resistor 21 and this potential and the amplitude of the square wave voltage are so adjusted that tube 11 is normally biased below cutoff and rises above cutoff only during the existence of the square wave pulse.

The plate 22 of tube 11 is connected to a source of positive potential 23 and is grounded for radio frequencies by the condenser 24. The cathode 26 is connected through the tank circuit 30 consisting of condenser 27 and inductance 28 to ground and this tank circuit is connected in circuit with tube 29 to form a Hartley oscillator, the plate 31 of which is grounded through condenser 32.

In operation as long as tube 11 is biased below cutoff, tube 29 oscillates freely and attains a peak amplitude across the tank circuit such that one the negative swing the cathode 26 is driven sufficient negative to overcome the static cutoff potential impressed on grid 18 from the source 19. When tube 11 becomes conducting its cathode impedance is shunted across the tank circuit 30 through the circuit the circuit consisting of cathode 26, conductor 33, tank circuit 30, condenser 24 and plate 22. Since this impedance is of the order of 100 ohms, the amplitude of oscillations of the oscillator is effectively limited to a value such that the tube 11 is caused to conduct on peak negative swings of the cathode 26. This value is a function of the static negative bias placed on the grid by the source 19 and hence by proper adjustment of this potential and the feedback potential of the oscillator by selection of the proper value for resistor 34, the oscillator 29 can be restricted to Class A operation.

If, however, a potential is applied to the grid 18 of tube 11 such that the static bias potential derived from source 19 is overcome and the grid 18 driven above cutoff, the tube 11 will conduct during the entire negative swing of cathode 26. Under these conditions, since the low cathode impedance of tube 11 is shunted across the tank circuit during this entire negative swing, the oscillations therein are rapidly damped out despite the energy supplied by oscillator 29. This is the condition which obtains when the square wave pulse B (Fig. 2) is applied to grid 18 through coupling condenser 16 and radio frequency choke 17. As indicated in Fig. 2 the amplitude of the square wave pulse is such that tube 11 is driven above the cutoff level as indicated by the dotted line and the tube therefore becomes conductive. This in turn results in a rapid damping of the oscillations in the tank circuit 30 as indicated by that portion of the waveform C which exists between dotted lines $t_1$ and $t_2$.

At the same time that the square wave pulse is being applied to the grid 18 of tube 11 which results in the aforementioned damping of the tank circuit 30, the radio frequency synchronizing pulse A (Fig. 2) is also impressed on the grid 18 through the coupling condenser 12 and the tube 11 is caused to act in the manner of a so-called "cathode follower" the load in the cathode circuit of the tube consisting of the tank circuit 30. Under these conditions the cathode and hence the tank circuit follows the varying potential of the synchronizing pulse and when the tank circuit is undamped at time $t_2$ by the termination of the square wave pulse B, the oscillations injected in the tank circuit by the synchronizing pulse acting through tube 11 are sustained in the same phase by the negative resistance of the oscillator 29.

By this means, therefore, the oscillator 29 oscillates freely from the time of transmission of one radio frequency pulse until the instant of transmission of the next in phase with the oscillations of the first radio frequency pulse. At the instant of the transmission of the second radio frequency pulse the oscillator is stopped and restarted in phase with the phase of the second radio frequency pulse which may radically depart from that of the first pulse and this action proceeds indefinitely so that there is always a comparison signal available which has the same phase as that of the last transmitted radio frequency pulse in point of time.

In practice it is found that these results may be obtained even though the succeeding radio frequency pulse is 180° out of phase with the preceding radio frequency pulse and when the number of cycles of synchronizing signal in which to effect phase synchronization is exceedingly limited. For example, the circuit has been found to work satisfactorily where the frequency is 30 megacycles per second and the time of pulse duration, that is, the time from $t_1$ to $t_2$ a mere ¼ microsecond. Under these conditions there are nominally only 7.5 cycles of the synchronization pulse to damp the oscillator circuit and restart it in its new phase, an exceedingly limited number to effect such action.

If too large a plate current flows in tube 11 during the time that the square wave pulse is applied thereto, there is a possibility that an oscillatory potential will be induced in the tank circuit which is random in phase with the synchronizing pulse and phase error be thus introduced. It has been found, however, that by adjusting the relative static potential and amplitude of the square wave pulse applied to the grid 18 so that the maximum grid potential rises just above cutoff sufficient damping can be obtained and at the same time the plate current kept at a minimum so that spurious oscillations are not induced in the tank circuit.

In Fig. 3 there is disclosed a more complete circuit for accomplishing a periodic rephasing of the oscillator to correspond with the phase of transmitted radio frequency pulses random in phase themselves.

Referring to this circuit, synchronizing radio frequency pulses which may be the transmitted radio frequency pulses or intermediate frequency pulses derived from mixing the transmitted signal with a signal of another frequency are impressed on the tuned circuit 40 by terminals 41, 41. These signals are preferably, although not necessarily, amplified by amplifiers 42 and 43 and their associated circuits and the amplified signals impressed on the grid 44 of tube 45. The amplifiers 42 and 43 are not essential to the operation of the circuit but are of advantage since their amplification makes the damping adjustment less critical and they assist in decoupling the input and output circuits.

The square wave or damping pulse is derived from terminals 46, 46 and may be obtained by detection and amplification of the synchronizing radio frequency pulse as illustrated in connection with the simplified circuit of Fig. 2 or in some other well known manner. This pulse is likewise impressed on the grid 44 of tube 45 in a manner similar to that in the circuit of Fig. 2 and the amplitude thereof may be regulated by means of the variable contact 47 on potentiometer 48.

There is, therefore, simultaneously impressed on the grid 44 of tube 45 a synchronizing radio frequency pulse and a damping square wave pulse and this tube operates in connection with the tank circuit 49 and oscillator in a manner similar to the operation of the circuit of Fig. 2. In this instance the tank circuit 49 has been illustrated as comprising an inductance 50, variable tuning condenser 51 and trimmer condenser 52. A resistance 53 may also be provided to be shunted across the tank circuit 49 by operation of switch 54 to turn off the oscillator 50 if desired.

The output of the oscillator 50 which as in the circuit of Fig. 2 consists of a continuously oscillating potential periodically damped at the time of synchronizing radio frequency pulse occurrence and then restarted and rephased so that the oscillations are coherent with the oscillations of the radio frequency pulses may then be transmitted through a buffer amplifier stage 55 to a line 56, 56 from whence the constantly rephased signal may be derived for comparison purposes or the like in determining Doppler shift as discussed heretofore.

What is claimed is:

1. A coherent oscillator comprising an oscillation generator, a tank circuit therefor, means for periodically damping said tank circuit and means for impressing an oscillating pulse signal on said tank circuit during said damping period whereby when said tank circuit is undamped the oscillations introduced by said oscillating pulse signal are sustained in the same phase by said oscillation generator.

2. A coherent oscillator according to claim 1, in which said means for periodically damping said tank circuit comprises a discharge tube normally biased beyond cutoff having its cathode impedance effectively shunted across said tank circuit and means for rendering said tube periodically and momentarily conductive.

3. A coherent oscillator according to claim 2 in which said means for impressing an oscillating pulse signal on said tank circuit includes said discharge tube.

4. A coherent oscillator comprising an oscillator tube, a tank circuit interconnecting the input and output circuits of said oscillator tube one terminal of said tank circuit being grounded, a discharge tube having at least cathode, plate and grid electrodes, a connection from said cathode to the ungrounded terminal of said tank circuit, an alternating current connection from said plate to ground whereby the cathode impedance of said discharge tube shunts said tank circuit, means for normally biasing said discharge tube beyond cutoff and means for simultaneously and periodically impressing on the input circuit of said discharge tube a first pulse which drives said tube above cutoff and a second synchronizing pulse of substantially the same frequency generated by said oscillator circuit but random in phase with respect thereto whereby said oscillator is first damped and then restarted in phase with the oscillations of said second synchronizing pulse.

5. A coherent oscillator according to claim 4 in which the static bias and first pulse amplitude are so adjusted that the first pulse drives said discharge tube only slightly above cutoff so that during its conducting period plate current is kept at a minimum.

6. A coherent oscillator according to claim 4 in which the ungrounded terminal of said tank circuit is connected to a grid electrode of said oscillator tube and the grounded terminal is connected to the plate electrode through a condenser.

7. The method of generating a continuous wave which is periodically rephased in accordance with the random phase of periodic oscillatory pulse signals which comprises generating continuous oscillations, periodically and in timed relation with said pulse signals damping said continuous oscillations and immediately restarting said oscillations in phase with the oscillatory pulse signal occurring during the damping period.

8. The method of operating a continuous wave oscillator having a tank circuit connected in the input and output circuits thereof which comprises, producing periodic and successive oscillatory pulse signals, forming successive constant amplitude pulse signals from successive ones of said oscillatory pulse signals of substantially equal time duration to said oscillatory pulse signals, employing said constant amplitude pulse signals to periodically damp said tank circuit and simultaneously and synchronously injecting said oscillatory pulse signals into said tank circuit whereby said oscillator periodically ceases to generate oscillatory signals and then resumes the generation of such oscillatory signals at its previous frequency but at a phase corresponding to the phase of the last injected oscillatory pulse signal.

References Cited in the file of this patent

UNITED STATES PATENTS 2,577,512     Cooper et al.  ------------ Dec. 4, 1951